Patented Dec. 8, 1936

2,063,448

UNITED STATES PATENT OFFICE 2,063,448

PROCESS FOR CONTROLLING HYDROGEN ION CONCENTRATION OF BUTYL ALCOHOL FERMENTATION MASHES

David A. Legg and Hugh R. Stiles, Terre Haute, Ind., assignors to Commercial Solvents Corporation, Terre Haute, Ind., a corporation of Maryland No Drawing. Application February 12, 1934,
Serial No. 710,897

5 Claims. (Cl. 195—44)

The present invention relates to an improved method for maintaining the desired hydrogen ion concentration in the mash of certain types of fermentation processes. More specifically, this invention relates to a process for maintaining the desired hydrogen ion concentration by means of certain physical forms of basic carbonates, hereinbelow described.

It is known that in a number of fermentation processes, particularly those in which intermediate products and/or end products of an acidic nature are produced, the metabolic functions of the organisms are favored by a hydrogen ion concentration in the mash lower than that secured by the normal activity of the microorganisms themselves. It has been the custom to maintain the desired hydrogen ion concentration by means of a water-insoluble basic material such as calcium carbonate, barium carbonate, etc. The materials used for this purpose in commercial scale fermentations have been ground limestone or calcite, usually of about 200 mesh size, or coarser. Such materials, when present in excess in the mash, serve to neutralize acidity when formed and thus maintain the hydrogen ion concentration within the necessary limits for satisfactory fermentation. In certain fermentations, for example those by means of organisms of the type *Clostridium propyl butylicum* (described in co-pending application Serial No. 650,036 by Muller and Legg, filed January 3, 1933) or by organisms of the type *Clostridium inverto-acetobutylicum* (described in co-pending application Serial No. 675,458 by Legg and Stiles, filed June 12, 1933), the optimum hydrogen ion concentration is more critical than in the usual types of fermentations having acidic intermediate products, and the yield will be found to drop markedly if the hydrogen ion concentration varies only slightly from the optimum. In such cases it is seen that it is essential that means be available for maintaining this optimum condition in fermentations carried out on a commercial scale.

The bacteria which have been designated *Clostridium propyl butylicum* in the present invention and which are so designated in the appended claims, comprise any bacteria having the following primary characteristics:

I. Morphological
  A. Rod-shaped
  B. Spore-forming—Clostridia and Plectrida
  C. Practically indistinguishable from members of the *Clostridium butyricum* group II. Biochemical
  A. Carbohydrate fermentation
    1. Inability to produce appreciable yields of butyl and isopropyl alcohols from starch as the only source of carbohydrate
    2. Inability to produce appreciable yields of butyl and isopropyl alcohols from sucrose as the only source of carbohydrate
    3. Inability to consistently produce yields greater than 20% calculated on the weight of the sugar from uninverted molasses
    4. Ability to produce high yields of butyl and isopropyl alcohols from glucose or inverted molasses
  B. Nitrogen metabolism
    1. Ability to produce high yields of butyl and isopropyl alcohols in sugar media containing ammonia as the principal source of nitrogen
    2. Ability to utilize degraded protein (including ammonia) as sole nitrogen source
    3. Inability to utilize undegraded protein as sole source of nitrogen
    4. Inability to liquefy gelatin or to produce more than very slight proteolysis of milk
  C. Oxygen requirements
    1. Anaerobic
  D. Temperature range for solvent production
    1. From 25° C. to 36° C., preferably 29° C. to 31° C.
  E. Hydrogen ion concentration for solvent production
    1. Final pH of 5.0–6.5, preferably 5.8–6.1

The bacteria designated herein as *Clostridium inverto-acetobutylicum* comprise any bacteria having the following primary characteristics:

I. Morphological
  A. Rod-shaped
  B. Spore-forming—Clostridia and Plectrida
  C. Practically indistinguishable from members of the *Clostridium butyricum* group II. Biochemical
  A. Carbohydrate fermentation
    1. Inability to produce appreciable yields of butyl alcohol and acetone from starch as the only source of carbohydrate
    2. Inability to produce appreciable yields of butyl alcohol and acetone from sucrose as the only source of carbohydrate
    3. Inability to consistently produce yields greater than 20% calculated on the weight of the sugar from uninverted molasses
    4. Ability to produce high yields of butyl alcohol and acetone from glucose or inverted molasses
  B. Nitrogen metabolism
    1. Ability to produce high yields of butyl alcohol and acetone in sugar media containing ammonia as the principal source of nitrogen
    2. Ability to utilize degraded protein (including ammonia) as sole nitrogen source
    3. Inability to utilize undegraded protein as sole source of nitrogen
    4. Inability to liquefy gelatin or to produce more than very slight proteolysis of milk
  C. Oxygen requirements
    1. Anaerobic
  D. Temperature range for solvent production
    1. From 25° C. to 36° C., preferably 29° C. to 31° C.
  E. Hydrogen ion concentration for solvent production
    1. Final pH of 5.0–6.5, preferably 5.7–6.1

In the past it has been found to be extremely difficult to duplicate, on a commercial scale, laboratory fermentations, particularly those by means of organisms of this latter type. It has been found that although all of the fermentation conditions prevailing in the laboratory experiment are duplicated, and an excess of ground calcite or commercially available insoluble neutralizing agent is present at all times during fermentation, the hydrogen ion concentration in the commercial scale fermentation is usually higher than that secured in the laboratory, with a resulting decrease in yield. It has now been discovered that the cause for this unexpected change in hydrogen ion concentration under apparently the same conditions is due to the differences in the shape and size of the vessels employed. In the ordinary laboratory fermentation vessel, i. e. the small Erlenmeyer flask (flat-bottomed conical) of the order of 500 c. c. to 1000 c. c. capacity, the ratio of height of mash and volume of mash to surface area of settled carbonate is quite low and the absolute height of the mash over the layer of settled carbonate is likewise quite low. In the usual type of commercial scale fermentation vessel, on the other hand, these factors are greatly increased. The resulting effect may be readily demonstrated by the following simple laboratory experiment.

A series of six Erlenmeyer flasks containing three liters of an inverted Cuban molasses mash (5.5% sugar) containing an excess of calcium carbonate is prepared in accordance with the method disclosed in the co-pending application, Serial No. 650,036, referred to above, and inoculated with a culture of *Clostridium propyl butylicum*. The flasks were incubated at 32° C., three of them being positioned in the usual upright manner and three being tilted so that approximately only one-half of the flat bottom of the flask was covered with liquid. The yields secured are shown in the table below.

*Table I*

| Yield of total solvents | | | |
|---|---|---|---|
| Tilted flasks | | Control flasks | |
| Grams per liter | Percent on wt. of sugar | Grams per liter | Percent on wt. of sugar |
| 12.0 | 21.8 | 14.0 | 25.5 |
| 12.9 | 23.4 | 14.3 | 26.0 |
| 13.2 | 24.0 | 14.4 | 26.3 |

It may be seen from the above results that a marked decrease in yield was obtained in the tilted flasks, i. e., when the ratio of height of mash and volume of mash to surface area of settled carbonate was substantially increased. It should be noted that the yields in the control flasks do not represent the optimum yields obtainable with this culture since the sugar concentration employed was above the optimum. However, the comparative results obtained in this experiment are representative of the effect of changing the shape (and the associated ratios referred to) of the fermentation vessel.

It is thus seen that the efficacy of one specific agent, viz., 200 mesh calcite in maintaining the desired hydrogen ion concentration depends to a large extent upon the size and shape of the vessel employed. It is believed that a body of mash in any particular vessel has a "space factor" dependent upon the ratio of height of mash and/or volume of mash to the surface area of the layer of settled carbonate and also upon the absolute height of the mash in the vessel. No absolutely accurate expression for this "space factor" has been found, but it is believed to be an expression of the nature:

$$C = \frac{(HV)^{1/2}}{A} + (H)^{1/8}$$

where H = height of mash in cm., V = volume of mash in cm.$^3$ and A = surface area of the layer of settled carbonate in cm.$^2$.

It has been found, for example, that in a series of fermentations of molasses mash by means of *Clostridium propyl butylicum*, carried out in widely different shaped and sized vessels, and again employing 200 mesh calcite as the hydrogen ion regulator, a yield of over 30% was obtained in only two cases. These were laboratory fermentations in an Erlenmeyer flask and a beaker, both having "space factors" below 3. In the other vessels, having space factors ranging from 3.19 to 3.73, the yields ranged from 29% to as low as 23.8%. These results are shown in the table below.

*Table II*

| Type of vessel | Volume of mash | Height of mash | Area of carbonate layer | $\frac{(HV)^{1/2}}{A}+(H)^{1/3}$ | Yield on wt. of sugar |
|---|---|---|---|---|---|
| | $Cm^3 \times 10^{-3}$ | $Cm$ | $Cm^2$ | | |
| 4 liter Erlenmeyer flask | 3.0 | 18.0 | 302.0 | 2.21 | 30.1 |
| 2 liter beaker | 1.2 | 6.8 | 132.5 | 2.08 | 31.5 |
| 1 liter round-bottom flask | 0.7 | 6.9 | 34.3 | 3.29 | 29.0 |
| 2 liter round-bottom flask | 1.7 | 10.2 | 61.7 | 3.47 | 27.6 |
| 550 gallon fermenter | 11050 | 171 | 9450 | 3.72 | 26.2 |
| 10,000 gallon fermenter | 18900 | 185 | 46800 | 3.19 | 28.9 |
| 10,000 gallon fermenter | 23280 | 232 | 48500 | 3.49 | 25.4 |
| 10,000 gallon fermenter | 28040 | 262 | 50200 | 3.73 | 23.8 |

It may be seen from the above table that good yields were obtained only in the laboratory fermentations in the beaker and the Erlenmeyer flask. However, it is apparent that even in the case of the 4 liter Erlenmeyer flask the space factor tended to decrease the yields somewhat. As has been previously mentioned, in the case of the usual small Erlenmeyer flasks (i. e. of the order of 500 c. c. to 1000 c. c.) no such effect can usually be observed. It may also be seen from the table that fair yields were obtained in the 1 liter round-bottom flask ("space factor"=3.29) and in the half-filled fermenter ("space factor"= 3.19), and poor yields were obtained in the remaining cases ("space factors"=3.47 and upwards). If the expression for the "space factor" given above is assumed to be approximately correct, it may be seen that factors above 3.0 result in decreased yields, and factors above 3.3 result in poor yields.

In spite of this discovery of the cause of the decreased yields in the commercial scale fermentations, it was found that none of the expected remedies were successful. An increase in the excess of calcite present was found to have no effect, or, if increased unduly, was found to have a detrimental effect. Agitation of the mash to secure better contact of the calcite generally resulted in decreased yields of the desired products. The continuous introduction of suitable neutralizing agents failed because of the mechanical difficulties involved. Numerous other attempts to remedy this situation by buffering the mash or by other similar means for hydrogen ion control have likewise failed.

The surprising discovery has now been made that the use of calcium carbonate or other insoluble non-toxic neutralizing agent in a substantially more finely divided state than that previously employed will result in full yields duplicating those obtained in laboratory experiments in small Erlenmeyer flasks. This is accomplished without the necessity of agitating the mash or adding any further neutralizing agents during the fermentation. Materials suitable for this purpose are precipitated barium, iron, or calcium carbonates, or ground natural materials of a substantially equally fine state of division. Of these materials, the calcium carbonates are preferred, owing to their cheapness and availability. A number of varieties of precipitated calcium carbonate are available for use in the manufacture of tooth paste, cosmetics, and the like, or for use as pure laboratory reagents. The naturally occurring calcium carbonates, e. g. chalk, limestone, etc., may be subjected to continued grinding until a sufficiently finely divided product is obtained, or may be passed in suspension through a colloid mill to yield the desired product. All of these materials are suitable for use in the present invention but due to their cost it is preferred to utilize a freshly precipitated calcium carbonate which may advantageously be precipitated from a lime suspension by means of fermentation gases containing a substantial amount of carbon dioxide.

It is to be understood, of course, that this invention is not to be limited to any particular neutralizing agent or to any method of preparing the same. Any calcium carbonate or other insoluble non-toxic neutralizing agent which presents an available surface during the fermentation substantially greater than that presented by the standard 200 mesh calcite will be found to give improved results. The available surface presented will, of course, depend upon the buoyancy of the particles or aggregates of the material during fermentation. This, of course, will in turn depend upon the size, surface structure and apparent density of the particles. Although the absolute test of the suitability of a given material should be made under fermentation conditions so that the gas evolution may play its part in maintaining the carbonate in a state of suspension, an approximate comparative determination suitable for most purposes may be made by a simple settling test from an aqueous suspension. Such a test is illustrated below.

Suspensions of 1.5 grams of each of a number of calcium carbonates in 500 c. c. of distilled water were placed in 500 c. c. graduated cylinders. The contents of the graduates were shaken by inverting twelve times and were then allowed to settle. At intervals the apparent volume of solids on the bottom and the degree of turbidity were noted. The results obtained for four types of calcium carbonate are recorded in the table below.

*Table III*

| Type of carbonate | Apparent volume of solids on bottom in c. c. | | | | Turbidity* | | | |
|---|---|---|---|---|---|---|---|---|
| | 11 min. | 21 min. | 41 min. | 56 min. | 11 min. | 21 min. | 41 min. | 56 min. |
| Wet CaCO₃ precipitated from lime by fermentation gas | 6.0 | 7.5 | 8.5 | 9.0 | M | M | M-L | L |
| Cosmetic grade precipitated CaCO₃ | 2.5 | 3.0 | 4.0 | 4.5 | D | D | M-D | M |
| Commercial ground chalk | 3.5 | 3.7 | 4.0 | 4.0 | M | M | L | L |
| 200 mesh ground limestone | 5.0 | 5.0 | 5.5 | 5.5 | M-L | L | L | L-C |

* D=dense
M=medium
L=light
C=clear

It may be seen from the above results that the settling test does not give absolutely comparative results since the distribution of various particle sizes in a given sample of material may vary considerably. Thus, in the above table the cosmetic grade of precipitated calcium carbonate gave even a lower apparent volume of solids in the bottom of the cylinder than the ground calcites. However, in this case the supernatant liquid was much more turbid than in the case of the other precipitated carbonates, indicating the presence of a considerable amount of very small particles. It is seen therefore that in the case of the precipitated calcium carbonates either the apparent volume of solids was greater or the turbidity of the supernatant liquid was greater than in the case of the ground calcites. This test therefore should be sufficient in most cases to enable one skilled in the art to choose a suitable type of calcium carbonate.

Although the mass and apparent density of the particles would be a more accurate criterion because of differences in surface structure and porosity of the particles, a sufficiently accurate determination for most purposes may be made by ascertaining the average size of the particles or aggregates. Such measurements will be found in most cases to follow closely the results obtained in the settling test as will be shown by the results below, which were obtained with the same calcium carbonates reported in Table III above.

Table IV

| Type of carbonate | Size of particles | Size of aggregates |
|---|---|---|
| | $\mu$ | $\mu$ |
| Wet CaCO₃ precipitated from lime by fermentation gas | 0.51–1.02 | 2.9–12.8 |
| Cosmetic grade precipitated CaCO₃ | 0.02–1.41 | 2.6–13.8 |
| Commercial ground chalk | 1.92–3.58 | 6.3–31.9 |
| 200 mesh ground limestone | 2.17–4.10 | 9.9–26.6 |

The above results were secured by examining a drop of a distilled water suspension containing three grams per liter of calcium carbonate. The drop was mounted in a quartz chamber and examined in a dark field with a microscope fitted with a calibrated drum micrometer.

It may be seen from the above results that a marked difference exists between the precipitated calcium carbonates and the commercial grades of ground calcite. Thus, it is believed to be evident that by means of a determination of both particle size and settling time one skilled in the art may readily choose a neutralizing agent sufficiently finely divided to remain in suspension to the desired extent during the fermentation and thus to maintain the optimum hydrogen ion concentration. However, it may be said that in general a neutralizing agent which presents an available surface during fermentation substantially greater than that presented by a slight excess of 200 mesh calcite, or which has a rate of settling from an aqueous suspension substantially lower than that of 200 mesh calcite, or which has an average particle size substantially less than that of 200 mesh calcite will be satisfactory when employing vessels having a ratio of height and/or volume of mash to surface area of settled neutralizing agent exceeding that obtained in small Erlenmeyer flasks. By the term "substantially" in this connection is meant sufficiently to show a measurable increase in yield in parallel fermentations in which 200 mesh calcite is compared with the finer material in vessels of unfavorable space factor.

The beneficial effect upon the hydrogen ion concentration, throughout the fermentation, which is secured by the use of finely divided neutralizing agents is illustrated in Table V below. The results reported in this table represent observations of the pH at different stages of the fermentation of an inverted molasses mash by means of *Clostridium propyl butylicum*, following the standard procedure set forth in co-pending application Serial No. 650,036.

Table V

| Type of carbonate | Hydrogen ion concentration as pH | | | | | Yield percent based on sugar |
|---|---|---|---|---|---|---|
| | Initial | 20 hrs. | 40 hrs. | 46 hrs. | 63 hrs. | |
| Wet CaCO₃ precipitated from lime by fermentation gas | 6.31 | 5.59 | 5.70 | 5.98 | 5.85 | 29.6 |
| Cosmetic grade precipitated CaCO₃ | 5.66 | 5.61 | 5.63 | 5.80 | 5.54 | 29.4 |
| Commercial ground chalk | 5.49 | 5.44 | 5.53 | 5.56 | 5.32 | 28.5 |
| 200 mesh ground limestone | 5.49 | 5.39 | 5.43 | 5.51 | 5.26 | 28.9 |

The above results were obtained in fermentations of three liters of mash in four liter Erlenmeyer flasks. The effect of the type of neutralizing agent on the yield would probably be less in the case of small Erlenmeyer flasks (i. e., of the order of 500 c. c. to 1000 c. c.) and would undoubtedly be more pronounced in the case of larger vessels.

The improved yields to be obtained in carrying out this invention are illustrated in Table VI below. These results were obtained in the fermentation of an inverted molasses medium by means of *Clostridium propyl butylicum*. The medium was prepared by hydrolyzing molasses of about 20% sugar concentration by heating with sulphuric acid equivalent to 5% on the weight of the sugar for 40 minutes at 20 lbs. pressure. At the conclusion of this inversion 0.7% of ammonia on the weight of the sugar was added and sufficient lime introduced to neutralize the remaining free acidity. An excess of freshly precipitated calcium carbonate (or ground chalk in other cases) amounting to 6% on the weight of the sugar was then introduced and the mash diluted to a sugar concentration of about 5% and sterilized for 30 minutes at 20 lbs. pressure. The fermentations were carried out in the same fermenters (10,000 gal. capacity) which were used for the last three fermentations reported in Table II, above. In each case the mash was inoculated with about 3% of an active culture of *Clostridium propyl butylicum* and incubated at 32° C. The table gives the initial and final hydrogen ion concentrations, as well as the yields and solvent ratios obtained.

Table VI

| Volume of mash | Hydrogen ion regulator | Initial pH | Final pH | Yield, percent on sugar | Solvent ratio | | |
|---|---|---|---|---|---|---|---|
| | | | | | Butyl alc. | Acetone | Ethyl and isopropyl alcs. |
| 6120 gals | Ground chalk | 5.89 | 5.23 | 25.4 | 69.0 | 16.9 | 14.1 |
| 6145 gals | CaCO₃ precipitated from lime by fermentation gas | 6.20 | 5.85 | 31.0 | 69.0 | 12.1 | 18.9 |
| 7510 gals | Ground chalk | 5.94 | 5.21 | 24.0 | 70.3 | 12.3 | 17.4 |
| 8220 gals | CaCO₃ precipitated from lime by fermentation gas | 5.98 | 5.71 | 31.2 | 67.2 | 4.7 | 28.1 |

As may be seen from the above results, an increase in yield of from 22% to 30% on the weight of the total solvents was obtained when precipitated carbonate rather than commercial ground chalk was employed. When it is considered that a single fermentation plant may produce millions of pounds of solvents in the course of a year the importance of such an increase in yield may readily be seen.

It is recognized that precipitated calcium carbonate has often been utilized for neutralizing the usual laboratory fermentations in small Erlenmeyer flasks. This, however, has been due to its availability as a laboratory reagent and not because of any improved result obtained thereby. As has been previously pointed out, in the case of laboratory fermentations in shallow vessels having a relatively large bottom surface, satisfactory results are obtained with commercial ground calcite, and in most cases no improvement may be noted when a more finely divided material is employed. The present invention, therefore, is limited to fermentations in which the ratio of height of mash and/or volume of mash to area of settled carbonate substantially exceeds that obtained in laboratory fermentations in small Erlenmeyer flasks i. e., in vessels with a "space factor" of the order of 3.0 and upwards. By the term "substantially" in this connection is meant sufficiently to show a measurable decrease in yield in parallel fermentations in which the vessel in question is compared with a small Erlenmeyer flask utilizing 200 mesh calcite in both cases.

It is thus seen that in carrying out our invention improved results may be obtained in any of the common types of commercial scale fermentation vessels merely by insuring a substantially greater available surface area of neutralizing agent during the fermentation than that secured by the use of the commercial grades of ground calcite in the same vessel. It should be noted that the term "available surface of neutralizing agent" as used here signifies the total exposed surface of the particles, as opposed to the term "surface area of the layer of settled neutralizing agent" as used elsewhere in this specification. The latter term signifies only the exposed surface area of the layer rather than the total exposed surface of the particles.

Although improved results may be secured in practically all cases merely by utilizing a neutralizing agent of smaller average particle size than that of 200 mesh calcite, in order to secure optimum results in any particular case it may be desirable to use a specific form of neutralizing agent. A large variety of types of neutralizing agents, especially calcium carbonates are readily available, ranging from 100 mesh or coarser down to the finest precipitated materials. One skilled in the art will usually be able to choose the correct material for a given fermentation merely from an inspection of the size and shape of the fermentation vessel. A rough but usually sufficient estimate may be made by correlating the space factor of the vessel with the degree of fineness of the neutralizing agent—the higher the space factor the finer the neutralizing agent to be employed and vice versa. However, a more accurate determination may very readily be made by carrying out a simple preliminary experiment in the form of a series of fermentations such as those reported in Table V above, using materials of different average particle size. In this way, the determination is made under the actual contemplated fermentation conditions and the correct choice of neutralizing agent is insured. It is thus seen that in its broadest aspects our invention relates to the use of a neutralizing agent of a degree of fineness corresponding to the size and shape of the body of fermenting mash in which it is to be employed.

It is to be understood, of course, that this invention is not to be limited to any of the specific examples given above. Although the invention was illustrated in connection with fermentations by means of *Clostridium propyl butylicum*, it is applicable to other fermentations having acidic intermediate and/or end products, as for example, fermentations by means of *Clostridium inverto-acetobutylicum*. In general it may be said that the invention is applicable to all fermentations by means of organisms whose metabolic functions are favored by a hydrogen ion concentration in the mash lower than that secured by the normal activity of said microorganisms. Likewise, the invention is not to be limited to any of the particular types of neutralizing agents mentioned. All insoluble non-toxic neutralizing agents having an available surface during the fermentation substantially greater than that presented by 200 mesh calcite are included within the scope of this invention. Likewise, the amount of neutralizing agent to be used in any particular fermentation may vary, depending upon the type of products secured. For example, although 6% of calcium carbonate on the weight of the sugar was specified for the fermentation by *Clostridium propyl butylicum*, amounts of 3.5 to 13%, based on the weight of the carbohydrate, in excess of that required to neutralize initial acidity may suitably be employed in fermentations of this type, as disclosed in co-pending applications Ser. Nos. 650,036 and 675,458 referred to above. The amount to be used in any case will be apparent to one skilled in the art from the nature of the particular fermentation. Other modifications or improvements may be combined with the present invention. For example, if a very active fermentation is involved, it may be desirable to accommodate for this activity in the choice of the neutralizing agent in accordance with co-pending application Ser. No. 710,898, filed February 12, 1934. In general it may be said that any modifications or the use of any equivalents which would naturally occur to one skilled in the art are included within the scope of this invention.

The invention now having been described, what is claimed is:

1. In the fermentation of a carbohydrate mash by means of butyl alcohol-producing bacteria whose metabolic functions are favored by a hydrogen ion concentration lower than that secured by the normal activity of the organisms in said mash, the mash being contained in a vessel shaped to have a space factor $$\frac{(HV)^{1/2}}{A} + (H)^{1/3}$$

greater than 3.0, where H represents the height of the mash in centimeters, V represents the volume of the mash in cubic centimeters, and A represents the area of the layer of settled neutralizing agent in square centimeters, the improvement which comprises effecting the fermentation in the presence of a finely divided non-toxic insoluble basic neutralizing agent in a concentration slightly in excess of that required to neutralize initial acidity, said neutralizing agent presenting an available surface during fermentation greater than that presented by an equal excess concentration of 100 mesh calcite in said mash.

2. In the fermentation of a carbohydrate mash by means of butyl alcohol-producing bacteria whose metabolic functions are favored by a hydrogen ion concentration lower than that secured by the normal activity of the organisms in said mash, the mash being contained in a vessel shaped to have a space factor $$\frac{(HV)^{1/2}}{A}+(H)^{1/8}$$

greater than 3.0, where H represents the height of the mash in centimeters, V represents the volume of the mash in cubic centimeters, and A represents the area of the layer of settled neutralizing agent in square centimeters, the improvement which comprises effecting the fermentation in the presence of a finely divided non-toxic insoluble basic neutralizing agent in a concentration slightly in excess of that required to neutralize initial acidity, said neutralizing agent having a rate of settling from an aqueous suspension lower than that of 200 mesh calcite.

3. In the fermentation of a carbohydrate mash by means of butyl alcohol-producing bacteria whose metabolic functions are favored by a hydrogen ion concentration lower than that secured by the normal activity of the organisms in said mash, the mash being contained in a vessel shaped to have a space factor $$\frac{(HV)^{1/2}}{A}+(H)^{1/8}$$

greater than 3.0, where H represents the height of the mash in centimeters, V represents the volume of the mash in cubic centimeters, and A represents the area of the layer of settled neutralizing agent in square centimeters, the improvement which comprises effecting the fermentation in the presence of a finely divided non-toxic insoluble basic neutralizing agent in a concentration slightly in excess of that required to neutralize initial acidity, said neutralizing agent having the average size of its particles and aggregates less than that of 200 mesh calcite.

4. In the fermentation of a carbohydrate mash by means of bacteria of the type *Clostridium propyl butylicum*, the mash being contained in a vessel shaped to have a space factor $$\frac{(HV)^{1/2}}{A}+(H)^{1/8}$$

greater than 3.0, where H represents the height of the mash in centimeters, V. represents the volume of the mash in cubic centimeters, and A represents the area of the layer of settled neutralizing agent in square centimeters, the improvement which comprises effecting the fermentation in the presence of a finely divided non-toxic insoluble basic neutralizing agent in a concentration slightly in excess of that required to neutralize initial acidity, said neutralizing agent presenting an available surface during fermentation greater than that presented by an equal excess concentration of 200 mesh calcite in said mash.

5. In the fermentation of a carbohydrate mash by means of bacteria of the type *Clostridium inverto-acetobutylicum*, the mash being contained in a vessel shaped to have a space factor $$\frac{(HV)^{1/2}}{A}-(H)^{1/8}$$

greater than 3.0, where H represents the height of the mash in centimeters, V represents the volume of the mash in cubic centimeters, and A represents the area of the layer of settled neutralizing agent in square centimeters, the improvement which comprises effecting the fermentation in the presence of a finely divided non-toxic insoluble basic neutralizing agent in a concentration slightly in excess of that required to neutralize initial acidity, said neutralizing agent presenting an available surface during fermentation greater than that presented by an equal excess concentration of 200 mesh calcite in said mash.

DAVID A. LEGG.
HUGH R. STILES.